(12) United States Patent
Wang

(10) Patent No.: US 7,478,784 B2
(45) Date of Patent: Jan. 20, 2009

(54) MECHANISM FOR ENABLING A SINGLE HAND ADJUSTING A VIEWING ANGLE OF FLAT DISPLAY

(75) Inventor: Jung-Sheng Wang, Jhonghe (TW)

(73) Assignee: Hannspree, Inc., Taipei (TW)

( * ) Notice: Subject to any disclaimer, the term of this patent is extended or adjusted under 35 U.S.C. 154(b) by 583 days.

(21) Appl. No.: 11/224,229

(22) Filed: Sep. 13, 2005

(65) Prior Publication Data

US 2006/0277719 A1    Dec. 14, 2006

(30) Foreign Application Priority Data

Jun. 9, 2005    (TW) .............................. 94209601 U

(51) Int. Cl.
*F16M 11/00*    (2006.01)
(52) U.S. Cl. .................. 248/161; 248/371; 248/917; 248/919; 248/923
(58) Field of Classification Search .............. 248/276.1, 248/309.1, 917–923, 161, 371; 361/683
See application file for complete search history.

(56) References Cited

U.S. PATENT DOCUMENTS

| 7,036,787 | B1 * | 5/2006 | Lin ............................. 248/676 |
| 2006/0175476 | A1 * | 8/2006 | Hasegawa et al. ......... 248/125.1 |
| 2006/0231697 | A1 * | 10/2006 | Hsu ........................ 248/125.9 |
| 2007/0045488 | A1 * | 3/2007 | Shin ........................ 248/176.1 |
| 2007/0102600 | A1 * | 5/2007 | Ishizaki et al. ........... 248/176.3 |

* cited by examiner

*Primary Examiner*—Amy J. Sterling
(74) *Attorney, Agent, or Firm*—Bacon & Thomas, PLLC

(57) ABSTRACT

The present invention is to provide a mechanism comprising a sliding assembly having a portion mounted in a fixed assembly and adapted to move a predetermined distance defined by the fixed assembly, wherein the sliding assembly has another portion for connecting with a support and the fixed assembly is connected to a body; and a resilient member being interconnected to with the fixed assembly and the sliding assembly. In response to exerting an elastic winding force or unwinding force by the resilient member the sliding assembly is adapted to slide with respect to the fixed assembly and a balance of force between the fixed assembly and the sliding assembly is reached when the sliding stops for maintaining both the support and the body at an angle about the supporting surface.

7 Claims, 5 Drawing Sheets

MECHANISM FOR ENABLING A SINGLE HAND ADJUSTING A VIEWING ANGLE OF FLAT DISPLAY

FIELD OF THE INVENTION

The present invention relates to viewing angle adjustment mechanisms for flat display and more particularly to a roll spring based mechanism situated inside of a flat display for enabling a single hand adjusting a viewing angle of the flat display about a supporting surface (e.g., desk-top).

BACKGROUND OF THE INVENTION

The world we are living in has entered an information era due to rapid changes of electronics technology. Recent years a wide variety of electronic products with multimedia feature are available in an even faster pace. Thus, people have more chances of choosing suitable entertainment and leisure activities. As electronics industry develops fast, consumers become more critical with respect to practicability, convenience, quality, and cost effectiveness of an electronic product as well as whether it can satisfy users' needs or not.

Currently, LCDs (liquid crystal displays) are the trend of displays compared to traditional CRT (cathode ray tube) displays, LCDs are compact, aesthetic, lightweight, inexpensive, and occupy less space. Thus, more and more people choose LCDs as computer monitors and TVs. Based on recent reports LCD TVs are mass produced by many major electronic manufacturers. It is highly possible that LCD TVs may become another popular product after DVDs in the world.

However, a drawback has been found when a person views LCD TVs. For example, a person may frequently adjust a viewing angle of LCD about a supporting surface (e.g., desk-top) due to personal viewing habit, individuals with various heights, or flare from screen.

A conventional LCD is shown in FIG. 1 and comprises a screen 1, a pivot 3 provided at the back of the screen 1, a rigid arm 2 having an upper end connected to the pivot 3 such that the screen 1 may pivot about the pivot 3, and a base 4 fixedly connected to a lower end of the arm 2. The base 4 is placed on a supporting surface (e.g., desk-top). The pivot 3 is in frictional contact with both the back of the screen 1 and the arm 2 so as to reliably maintain the screen 1 at its desired angle. Thus, two hands are required to adjust an angle of the screen 1 of the LCD. A person uses one hand holding the screen 1 to adjust the viewing angle and the other hand holding the base 4 for preventing it from moving in the process of adjusting viewing angle. In other words, it is impossible of adjusting a viewing angle of the screen 1 single-handed. This is rather inconvenient when only one hand is available (e.g., one hand is occupied). Thus, it is desirable to provide a novel mechanism for enabling a single hand adjusting a viewing angle of a flat display in order to overcome the inadequacy of the prior art.

SUMMARY OF THE INVENTION

After considerable research and experimentation, a mechanism for enabling a single hand adjusting a viewing angle of a flat display according to the present invention has been devised so as to overcome the above drawback of the prior art.

It is an object of the present invention to provide a mechanism for enabling a single hand adjusting a viewing angle of a flat display about a supporting surface comprising a fixed assembly, a sliding assembly, and a support. The fixed assembly is connected to a body such that the body can move as the fixed assembly moves. A support has a top disposed at a bottom of the sliding assembly. A resilient member is interconnected to the fixed assembly and the sliding assembly. In response to exerting an unwinding force by the resilient member the support may extend out of the body. In response to exerting a winding force by the resilient member the support may retract into the body. A balance of force between the mechanism and the body is reached when the force is removed for maintaining both the support and the body at an angle about the supporting surface.

The above and other objects, features and advantages of the present invention will become apparent from the following detailed description taken with the accompanying drawings.

DETAILED DESCRIPTION OF THE PREFERRED EMBODIMENTS

Figure 1:
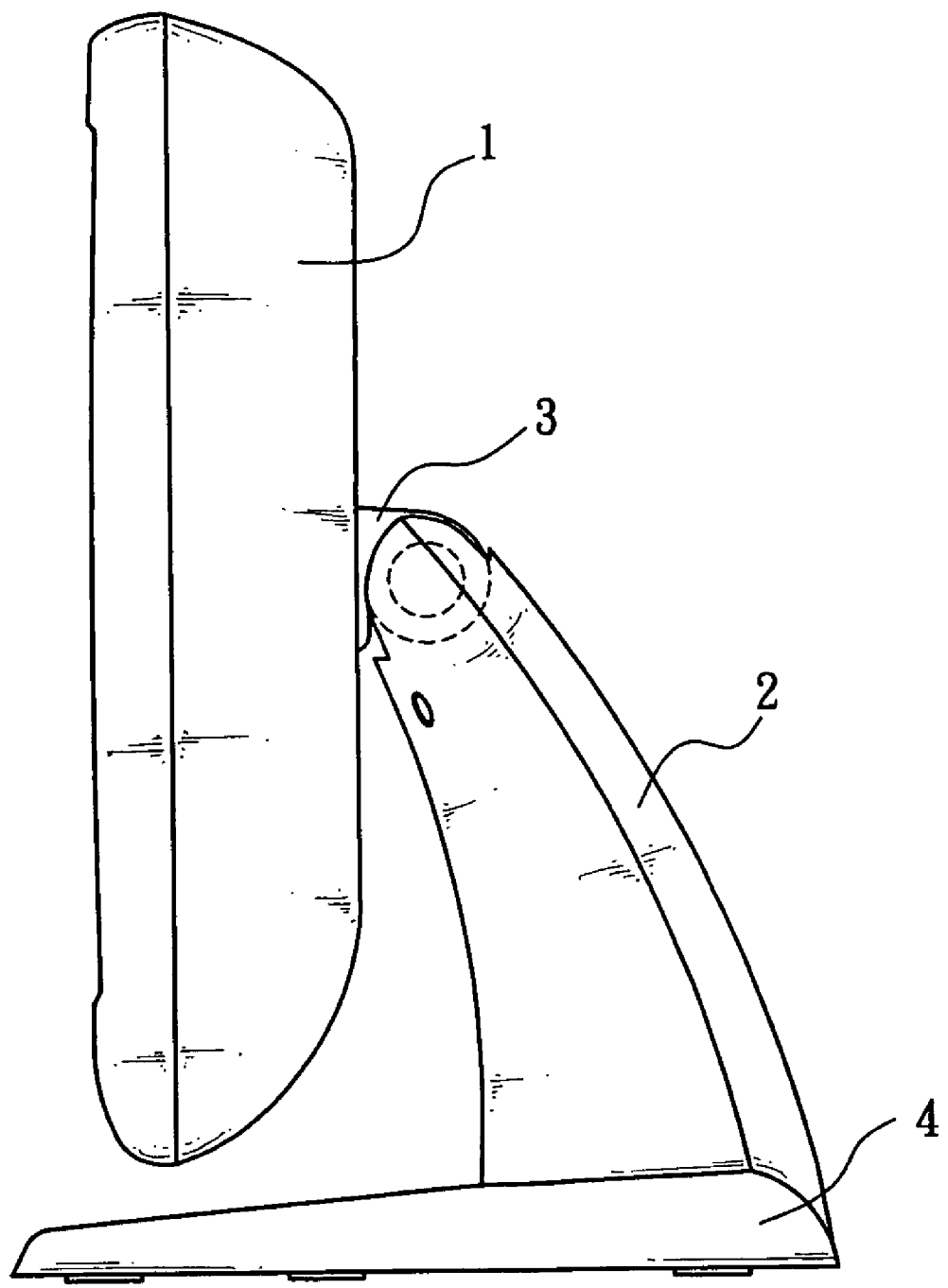
FIG. 1 is a side view of a conventional LCD.
Figure 2:
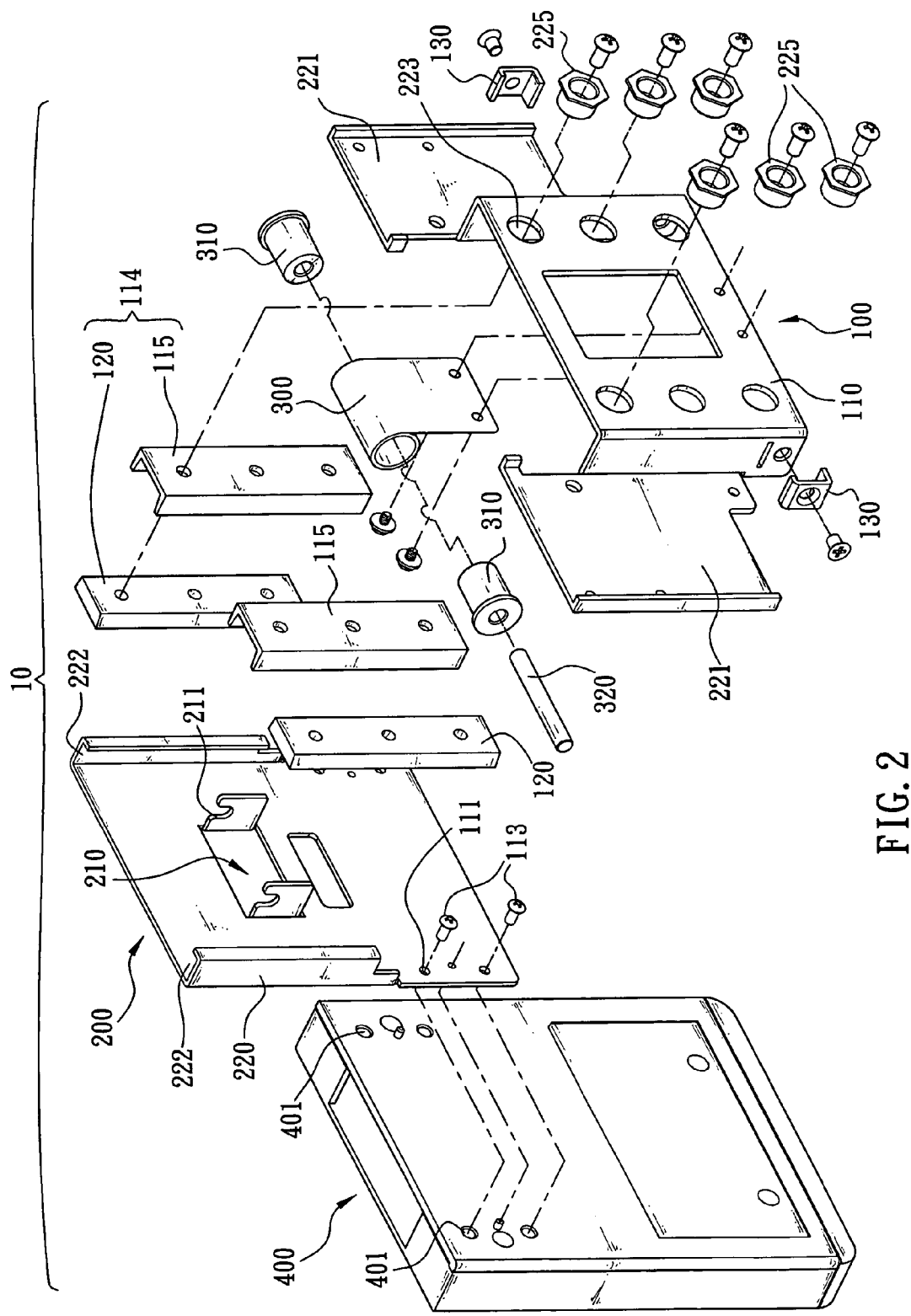
FIG. 2 is an exploded view of a preferred embodiment of mechanism for enabling a single hand adjusting a viewing angle of flat display according to the invention.
Figure 4:
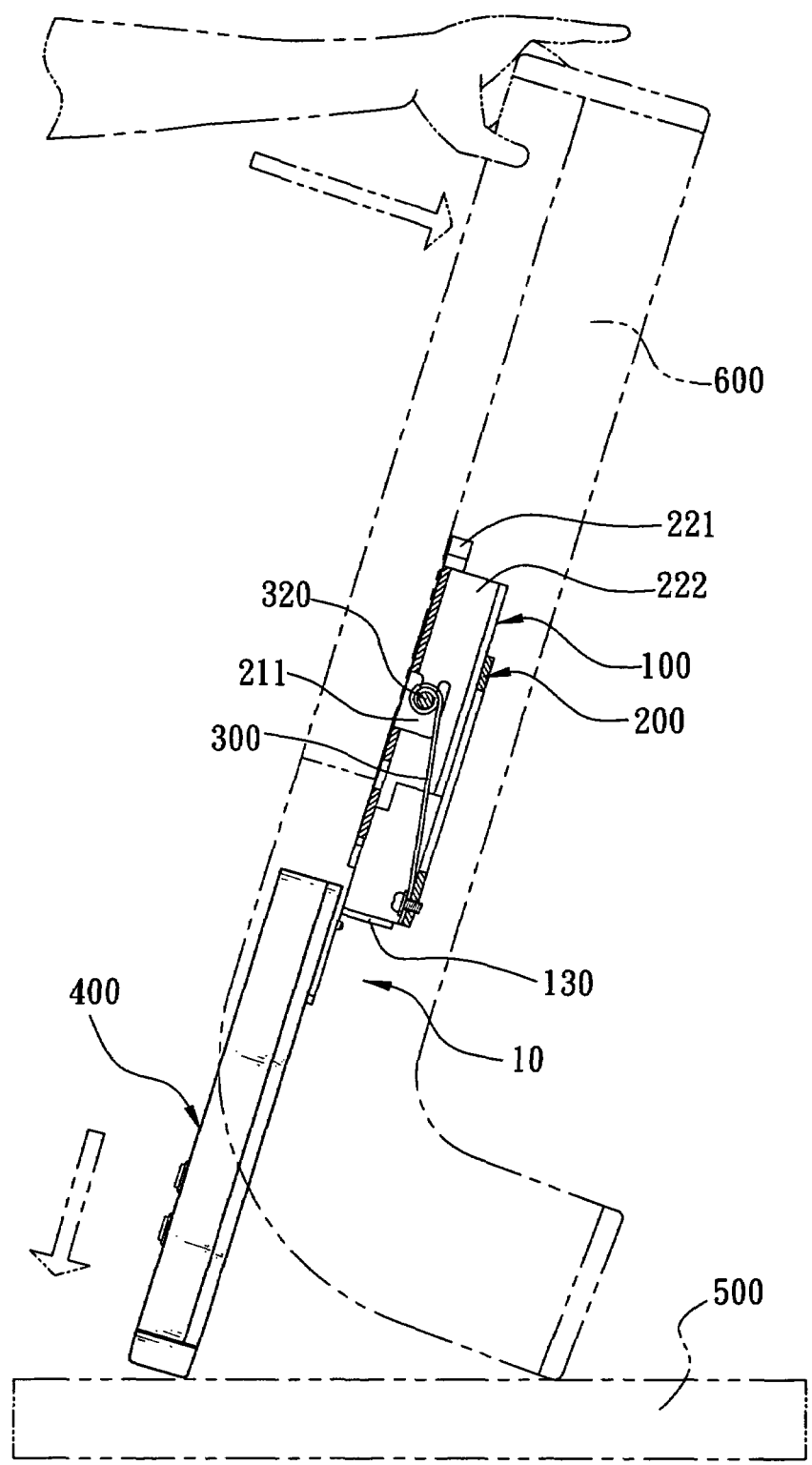
FIGS. 4 and 5 are side views in part section schematically depicting an angle adjustment operation of the flat display.
Figure 5:
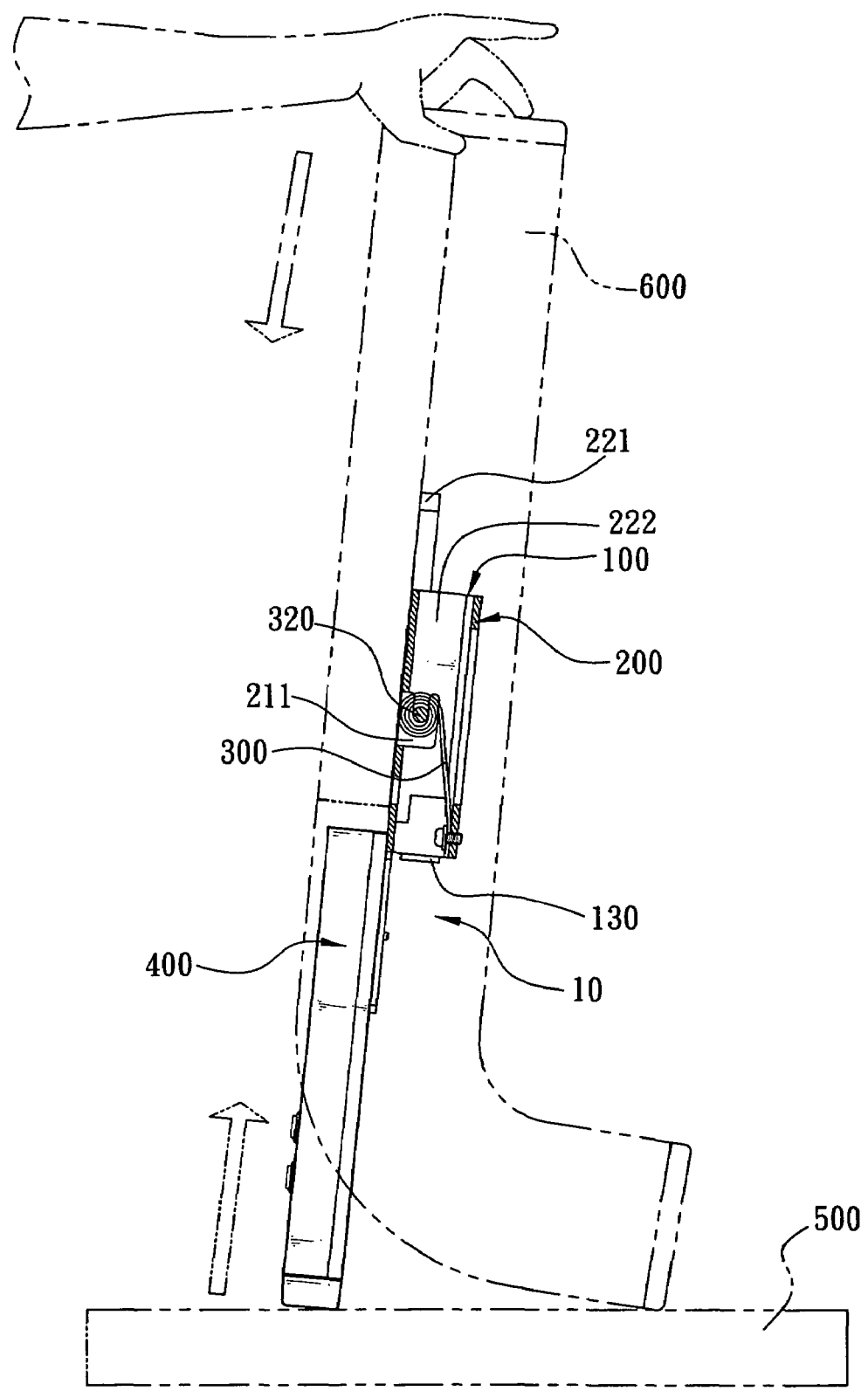

Referring to FIGS. 2, 4, and 5, a mechanism 10 for enabling a single hand adjusting a viewing angle of a flat display in accordance with a preferred embodiment of the invention comprises a fixed assembly 100, a sliding assembly 200, and a support 400. An inner surface of the support 400 is provided at one surface of the sliding assembly 200 and an outer surface thereof is supported on a supporting surface (e.g., desktop) 500. A rear surface of the fixed assembly 100 is connected to a front surface of a body 600. Thus, the body 600 can move as the fixed assembly 100 moves. A portion of the sliding assembly 200 is mounted in the fixed assembly 100 and is adapted to move a distance defined by the fixed assembly 100. A resilient member 300 is interconnected to the fixed assembly 100 and the sliding assembly 200. As shown in FIG. 5, in response to exerting a force upon (i.e., pushing down) the body 600 the support 400 may retract into the body 600 due to reaction of the supporting surface 500. And in turn, the resilient member 300 winds to draw the sliding assembly 200 upward until a balance is reached. At this position, a balance between an elastic force and weight is reached with respect to the mechanism 10 and the body 600. Thus, the support 400 and the body 600 are at an angle about the supporting surface 500 and the angle is maintained accordingly. As shown in FIG. 4, in response to exerting a force upon (i.e., substantially pushing forward) the mechanism 10 (or the body 600) the above balance no loner exists. Thus, the support 400 may extend downward due to its weight. As such, the resilient member 300 unwinds to increase an angle (i.e., oblique angle of the body 600) until a movement of the sliding assembly 200 is confined by the fixed assembly 100 or a balance of force is reached between the mechanism 10 and the body 600 (i.e., the movement of the sliding assembly 200 is stopped).

Referring to FIG. 2, in the embodiment a receptacle 210 is provided inside the sliding assembly 200 facing an inner surface of the fixed assembly 100. The resilient member 300 has one end provided at the receptacle 210. The sliding assembly 200 comprises two L-shaped flanges 220 at both sides projected toward the fixed assembly 100. A channel 222 is thus defined by the flange 220 and the side of the sliding assembly 200. A plurality of first holes 111 are provided at a lower portion of either side of the sliding assembly 200. A plurality of second holes 401 are provided at an upper portion of both side of the support 400 and are disposed corresponding to the first holes 111. A plurality of first fasteners 113 are driven through the first holes 111 and the second holes 401 to fasten the support 400 at an outer surface of the sliding assembly 200. As a result, the support 400 and the sliding assembly 200 can move toward either direction as a unitary member.

Referring to FIGS. 2 and 4, in the preferred embodiment of the invention, a frame 110 of U-section is formed at a central portion of the fixed assembly 100. A board 221 is extended outwardly from either side of the frame 110. The boards 221 are secured onto an inner surface of the body 600. Thus, the body 600 may move toward the fixed assembly 100 as the boards 221 move. A plurality of third holes 223 are provided on a main portion of the frame 110 proximate either side. A plurality of second fasteners 225 are driven through the third holes 223 to cause either buffer member 114 to contact either side of the sliding assembly 200 in which the buffer members 114 are fitted into the channels 222 and the channels 222 are adapted to slide about the buffer members 114. The buffer members 114 are adapted to provide dynamic friction and static friction between the fixed assembly 100 and the sliding assembly 200 in which the dynamic friction is adapted to buffer a returning force of the resilient member 300 and reduce movement speed of the support 400 when a relative movement between the fixed assembly 100 and the sliding assembly 200 occurs, and the static friction is adapted to provide a force to maintain a fixed relationship between the fixed assembly 100 and the sliding assembly 200 when an elastic force of the resilient member 300 exerted upon the mechanism 10 reaches a balance with respect to weight of the body 600.

Figure 3:
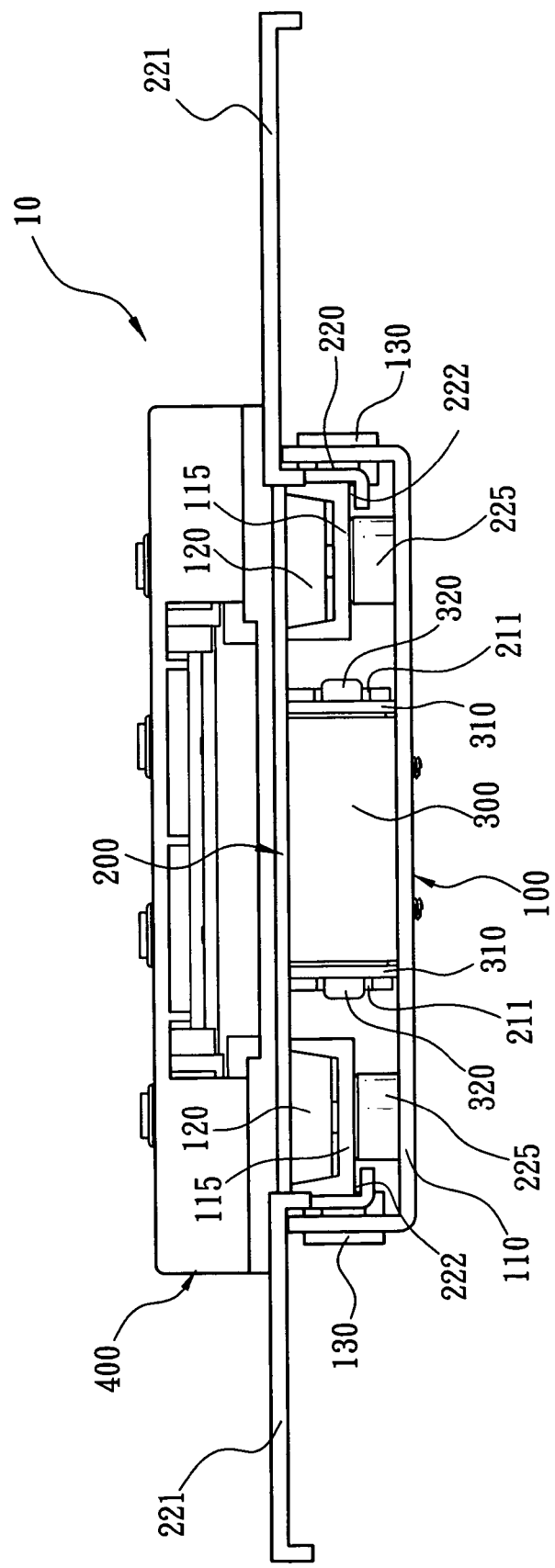
FIG. 3 is a top plan view of the assembled mechanism of FIG. 2.

Referring to FIG. 3 in conjunction with FIG. 2, in the embodiment the buffer member 114 is comprised of an elongate groove member 115 of U-section and an elongate block 120 fitted in a space defined by the groove member 115. Thus, the groove member 115 is adapted to fasten between the elongate block 120 and the fixed assembly 100. The groove member 115 is also fitted in the channel 222. The groove member 115 is formed of a substance having a higher friction coefficient (e.g., plastics or rubber). Outer surface of the groove member 115 urges against an inner surface of the channel 222 for buffering a sliding of the groove member 115 along the channel 222. Such buffering aims at decreasing the sliding speed. Otherwise, a desired angle adjustment may be difficult to achieve. The channel 222 is required to overcome a maximum static friction between itself and the groove member 115 when the channel 222 moves along the groove member 115. Friction depends on friction coefficient, different frictions are generated by different materials and different materials have different friction coefficients. Friction coefficient has a value in the range from 0 to 1. Larger of the value the larger of the friction will be and to the contrary, smaller of the value the smaller of the friction will be. Thus, it is desirable to choose a material having an optimum friction coefficient in order to maintain a balance of the mechanism 10 and the body 600 when the balance is reached (see FIG. 4). Otherwise, a minimum force exerted upon the mechanism 10 or the body 600 may compromise the balance.

Referring to FIG. 2, in the embodiment of the invention the resilient member 300 is implemented as a roll of elastic member and is adapted to return to its wound state after pulling to extend. That is, the returning force of the resilient member 300 is adapted to wind the resilient member 360 to its original winding state when the force of extending itself is removed.

One end of the resilient member 300 is formed as a sleeve and the other end thereof is fastened at the fixed assembly 100. Two hollow cylinders 310 are fitted in both ends of the sleeve. A pin 320 is inserted through the bores of the cylinders 310 to anchor its both ends in slots 211 at both sides of the receptacle 210. Thus, the resilient member 300 may elastically rotate about the slots 211 of the receptacle 210 when the resilient member 300 winds or unwinds. As a result, both the fixed assembly 100 and the sliding assembly 200 move. As shown in FIG. 5, in response to exerting a force upon (i.e., pushing down) the body 600 the support 400 may retract into the body 600 due to reaction of the supporting surface 500. And in turn, the resilient member 300 winds to draw the sliding assembly 200 upward until a balance position is reached. At this position, a balance between an elastic force and weight is reached with respect to the mechanism 10 and the body 600.

Referring to FIG. 2, a stop member 130 is provided at either side of the fixed assembly 100. The stop members 130 are adapted to prevent the resilient member 300 from extending over its predetermined extent when the channels 222 slide downward along the groove members 115.

In the invention the body 600 is a screen. Referring to FIGS. 4 and 5, for adjusting a viewing angle of the screen a user may push down the screen (see FIG. 5). A static friction between the channels 222 and the buffer members 114 is removed and the balance is thus compromised (see FIG. 2). The support 400 may retract into the body 600 due to reaction of the supporting surface 500. And in turn, the resilient member 300 winds until a desired viewing angle of the screen about the supporting surface 500 is reached. At this time, the screen stops since a balance between an elastic winding force of the resilient member 300 and weight of the body 600 is reached. Alternatively, a user may push the body 600 toward a direction as shown by an upper arrow in FIG. 4. In response, the support 400 may extend downward about the supporting surface 500 due to its weight. As such, the resilient member 300 unwinds to increase an oblique viewing angle of the screen until a desired oblique viewing angle of the screen is reached. At this time, the screen stops since a balance between an elastic unwinding force of the resilient member 300 and weight of the body 600 is reached. By configuring as above, a user may use either hand to easily adjust an angle of the mechanism 10 about a supporting surface 500 until a desired oblique viewing angle of the screen is reached. At this time, the adjustment can be stopped immediately. As an end, angle adjustment of the screen is finished and the balance is maintained accordingly.

While the invention herein disclosed has been described by means of specific embodiments, numerous modifications and variations could be made thereto by those skilled in the art without departing from the scope and spirit of the invention set forth in the claims.

What is claimed is:

1. A mechanism for enabling one-hand adjusting of a viewing angle of a flat display about a supporting surface comprising:
   a body;
   a fixed assembly having a rear surface connected to a front surface of the body such that the body is adapted to move as the fixed assembly moves;
   a sliding assembly having a portion mounted in the fixed assembly and adapted to move a predetermined distance defined by the fixed assembly;
   a support having a top disposed at a bottom of the sliding assembly and a bottom disposed on a supporting surface for supporting the body; and a resilient member interconnected to the fixed assembly and the sliding assembly, wherein in response to exerting an elastic winding force or unwinding force by the resilient member, the sliding assembly is adapted to slide with respect to the fixed assembly and a balance of force between the fixed assembly and the sliding assembly is reached when the sliding stops for maintaining both the support and the body at an angle about the supporting surfaces, wherein the sliding assembly comprises:

a receptacle disposed inside the sliding assembly facing an inner surface of the fixed assembly for receiving the resilient member; and two L-shaped flanges disposed at both sides of the sliding assembly projected toward the fixed assembly, each flange being adapted to form a channel with respect to the side of the sliding assembly;

wherein a plurality of first holes are disposed at a lower portion of at least a first side of the sliding assembly, a plurality of second holes are disposed at an upper portion of at least a first side of the support and are disposed corresponding to the first holes, and a plurality of first fasteners are driven through the first holes and the second holes to fasten the support at the sliding assembly;

wherein the resilient member is shaped as a roll of elastic member and is adapted to return to its original winding state after a force of extending itself is removed, one end of the resilient member is formed as a sleeve and the other end thereof is fastened at the fixed assembly, a hollow cylinder is respectively fitted in each end of the sleeve, and a pin is inserted through the cylinders having both ends respectively anchored in a slot at a side of the receptacle, and wherein the resilient member is adapted to rotate about the slots of the receptacle when the resilient member winds or unwinds for moving both the fixed assembly and the sliding assembly.

2. The mechanism of claim 1, wherein the fixed assembly comprises:

a frame of U-section formed at its central portion, the frame including a board extended outwardly from both sides thereof, the boards being secured onto an inner surface of the body such that the body is adapted to move toward the fixed assembly as the boards move, and a plurality of third holes disposed on a main portion of the frame proximate the sides of the frame;

two buffer members; and a plurality of second fasteners driven through the third holes to cause the buffer members to respectively contact the first side and a second side of the sliding assembly wherein the buffer members are fitted into the channels and the channels are adapted to slide about the buffer members.

3. The mechanism of claim 2, wherein each buffer member comprises:

an elongate block; and an elongate groove member of U-section, wherein the block is fitted in a space defined by the groove member, the groove member is adapted to fasten between the block and the fixed assembly, and the groove member is fitted in the channel.

4. The mechanism of claim 3, wherein the groove member is formed of plastics.

5. The mechanism of claim 3, wherein the groove member is formed of rubber.

6. The mechanism of claim 3, further comprising a stop member disposed at each side of the fixed assembly, the stop members being adapted to prevent the resilient member from extending over its predetermined extent when the channels slide downward along the groove members.

7. The mechanism of claim 1, wherein the body is a flat display.

* * * * *